United States Patent
Ito

(10) Patent No.: US 7,265,925 B2
(45) Date of Patent: Sep. 4, 2007

(54) RECORDED DATA DELETING DEVICE FOR HARD DISK

(75) Inventor: Tomoaki Ito, Osaka (JP)

(73) Assignee: Orient Instrument Computer Co. Ltd., Chuo-ku, Osaka-shi, Osaka (JP)

( * ) Notice: Subject to any disclaimer, the term of this patent is extended or adjusted under 35 U.S.C. 154(b) by 39 days.

(21) Appl. No.: 10/507,566

(22) PCT Filed: May 7, 2002

(86) PCT No.: PCT/JP02/04448

§ 371 (c)(1),
(2), (4) Date: Sep. 13, 2004

(87) PCT Pub. No.: WO03/077237

PCT Pub. Date: Sep. 18, 2003

(65) Prior Publication Data

US 2005/0141118 A1    Jun. 30, 2005

(30) Foreign Application Priority Data

Mar. 14, 2002    (JP)    ............................... 2002-001355

(51) Int. Cl.
  *G11B 5/03*    (2006.01)
  *H01F 13/00*    (2006.01)
  *H01H 47/00*    (2006.01)
(52) U.S. Cl. ........................................ 360/66; 361/149
(58) Field of Classification Search .................... None
  See application file for complete search history.

(56) References Cited

U.S. PATENT DOCUMENTS

| | | | |
|---|---|---|---|
| 5,959,824 A | | 9/1999 | Schultz et al. |
| 5,969,933 A | * | 10/1999 | Schultz et al. ............... 361/149 |
| 6,711,102 B1 | * | 3/2004 | Murakami et al. ....... 369/13.36 |
| 2001/0043420 A1 | | 11/2001 | Kohji |

FOREIGN PATENT DOCUMENTS

| | | |
|---|---|---|
| DE | 197 36 383 A1 | 2/1999 |
| GB | 2 234 388 A | 1/1991 |
| JP | 01-144202 | 6/1989 |
| JP | 01 320602 | 12/1989 |
| JP | 2-140605 | 11/1990 |
| JP | 3083683 | 11/2001 |
| WO | WO98/49674 | 11/1998 |

OTHER PUBLICATIONS

IBM Technical Disclosure Bulletin, IBM Corp. New York, US, vol. 35, No. 3, Aug. 1, 1992, p. 178, XP000326228.

* cited by examiner

*Primary Examiner*—William Korzuch
*Assistant Examiner*—Daniell L. Negrón
(74) *Attorney, Agent, or Firm*—Wood, Phillips, Katz, Clark & Mortimer

(57) ABSTRACT

A recorded data eraser 1 defines therein a cavity 2 for insertion of a hard disk drive 20 in the cavity 2 and includes a coil 4 being arranged around the cavity 2 so as to encircle the hard disk drive 20 when the hard disk drive 20 is inserted in the cavity 2, and a DC power supply circuit 8 for producing a magnetic field in the coil 4.

20 Claims, 4 Drawing Sheets

RECORDED DATA DELETING DEVICE FOR HARD DISK

TECHNICAL FIELD

The present invention relates to a recorded data eraser for a hard disk drive used for erasing data recorded in a hard disk drive.

BACKGROUND ART

When a hard disk drive is abandoned or reused, data recorded on a hard disk as a recording medium in the hard disk drive are commonly erased in view of confidential nature.

Such erase of recorded data in a hard disk drive is conventionally done by repeatedly writing predetermined data such as "00" over data on the hard disk. However, the erasing process by the data overwriting has a problem of heavy workloads and time-consuming. For example, it takes more than 12 hours to erase data on a hard disk of 20 gigabytes of storage capacity.

On the other hand, as an eraser for erasing data on floppy disks and tapes, which are also recording media, a toroidal coil formed by a conductive wire wound around an outer periphery of a ring-shaped core, arranged in a casing of an eraser body and connected to an AC power is known. The eraser arranges a floppy disk or a tape at an outer face of the eraser body and applies an alternating current to the coil from the AC power so as to generate an alternating magnetic field, whereby erasing data recorded on the floppy disk or the tape.

However, in the case of erasing data in a hard disk drive by using the eraser, since a hard disk inside the hard disk drive is accommodated within a casing made of metal such as iron and aluminum, the magnetic force does not reach the hard disk inside the hard disk drive, failing to erase data recorded on the hard disk only with the hard disk drive arranged at an outer face of the eraser and with a magnetic field generated by the eraser. To generate a stronger magnetic field, there is a problem to make a coil heavier, resulting in increasing a weight of the entire eraser.

It is therefore an object of the present invention made in view of the problems and drawbacks described above to provide an advanced recorded data eraser for a hard disk drive that erases data recorded on a hard disk readily and with certainty.

SUMMARY OF THE INVENTION

One embodiment of the present invention is a recorded data eraser for a hard disk drive defining therein a cavity for insertion of the hard disk drive in the cavity and including a coil being arranged around the cavity so as to encircle the hard disk drive when the hard disk drive is inserted in the cavity, and a DC power supply circuit for producing (or generating) a magnetic field in the coil.

Since the eraser has the coil for production of the magnetic field arranged around the cavity so as to encircle the hard disk drive, the strong magnetism produced in the coil is used for erasing data, thereby erasing data on a hard disk not only with the disk in the drive exposed but also with the disk clad in a metal casing.

Further, the magnetic field produced in the coil is used effectively, so as to make the coil smaller and lighter in weight and thus making the entire eraser lighter in weight, compared with a conventional arrangement of the hard disk drive at the outer side of the coil.

Another embodiment of the present invention is a recorded data eraser for a hard disk drive defining therein a cavity for insertion of the hard disk drive in the cavity and including a coil being arranged around the cavity so as to encircle the hard disk drive when the hard disk drive is inserted in the cavity, a DC power supply circuit for producing a magnetic field in the coil, and a permanent magnet provided in a position where the magnet exerts a magnetic force on the hard disk drive inserted in the cavity, adapted to maintain a magnetic flux density in the cavity within the range of 6,000 to 15,000 gauss in erasing data in the hard disk drive, wherein the DC power supply circuit includes a capacitor for charging and discharging and a switching device for discharging the capacitor into the coil, and adapted to produce a magnetic field in the coil by the discharge of the capacitor for duration of 10 ms or less.

In addition to the first advantage, the permanent magnet is provided in a position where the magnet exerts a magnetic force on the hard disk drive inserted in the cavity of the eraser, thereby ensuring further lightness in its weight. Further, the magnetic field produced in the cavity is set within the range of 6,000 to 15,000 gauss at the magnetic flux density, thereby making sure to erase data. Still further, since the DC power supply circuit includes a capacitor for charging and discharging and a switching device for discharging the capacitor into the coil, the discharge of the capacitor into the coil by the switching device produces the magnetic field in the coil. Yet further, production of the magnetic field in the coil by the discharge of the capacitor is set for duration of 10 ms or less, thereby enabling an efficient data erase in a short period.

Other objects, features, and advantages of the present invention will become more apparent from the following detailed description.

DESCRIPTION OF THE PREFERRED EMBODIMENTS

Figure 1:
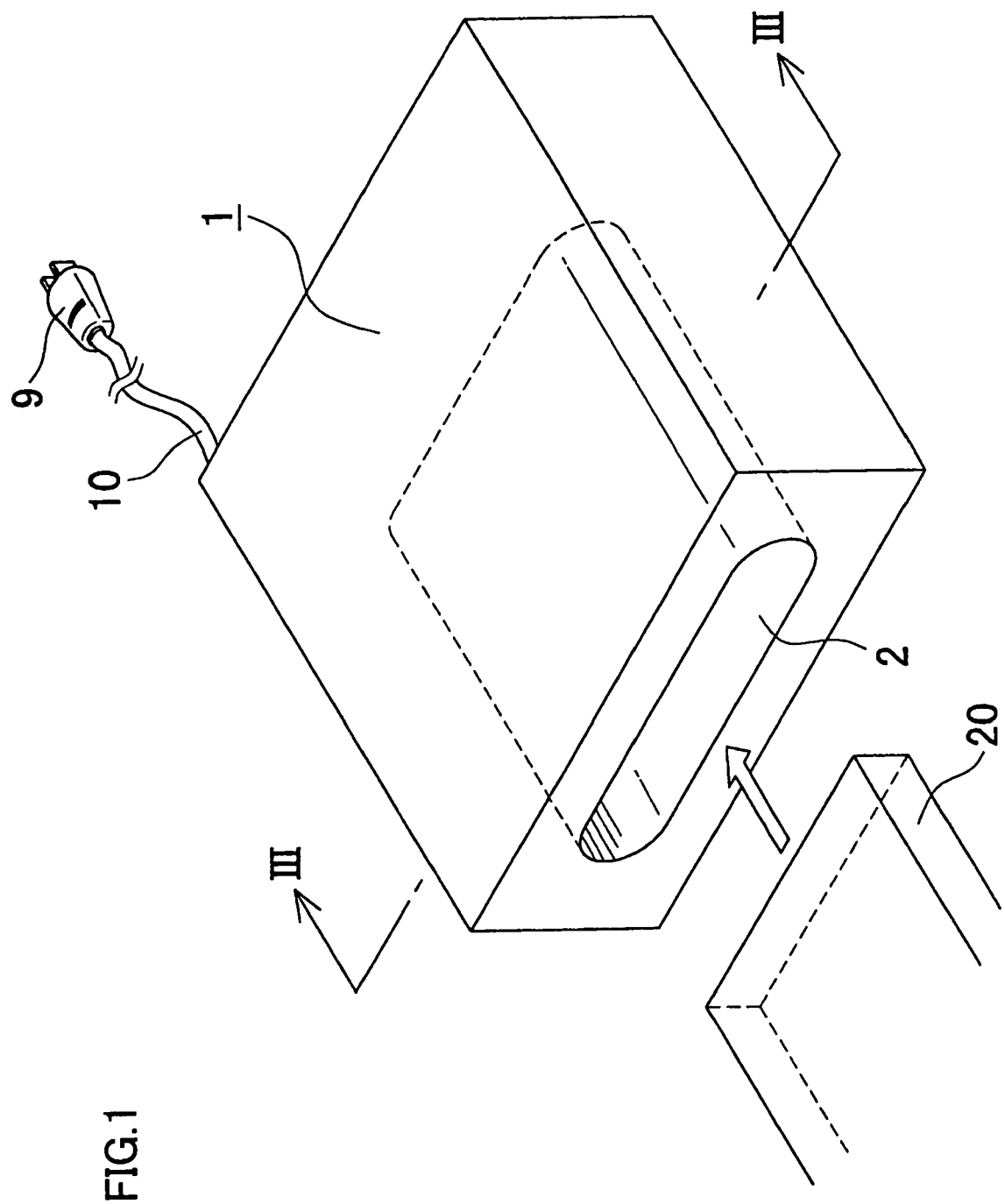
FIG. 1 is a perspective view of a data eraser that is an embodiment of the present invention.

FIGS. 1 to 4 show a data eraser for a hard disk drive that is a preferred embodiment of the present invention.

Referring to the figures, a reference numeral 1 denotes the data eraser that includes a cavity 2 for insertion of a hard disk drive, with an opening at one end face of the eraser, in an oval (a racetrack) shape at cross section, and extending horizontally.

Figure 2:
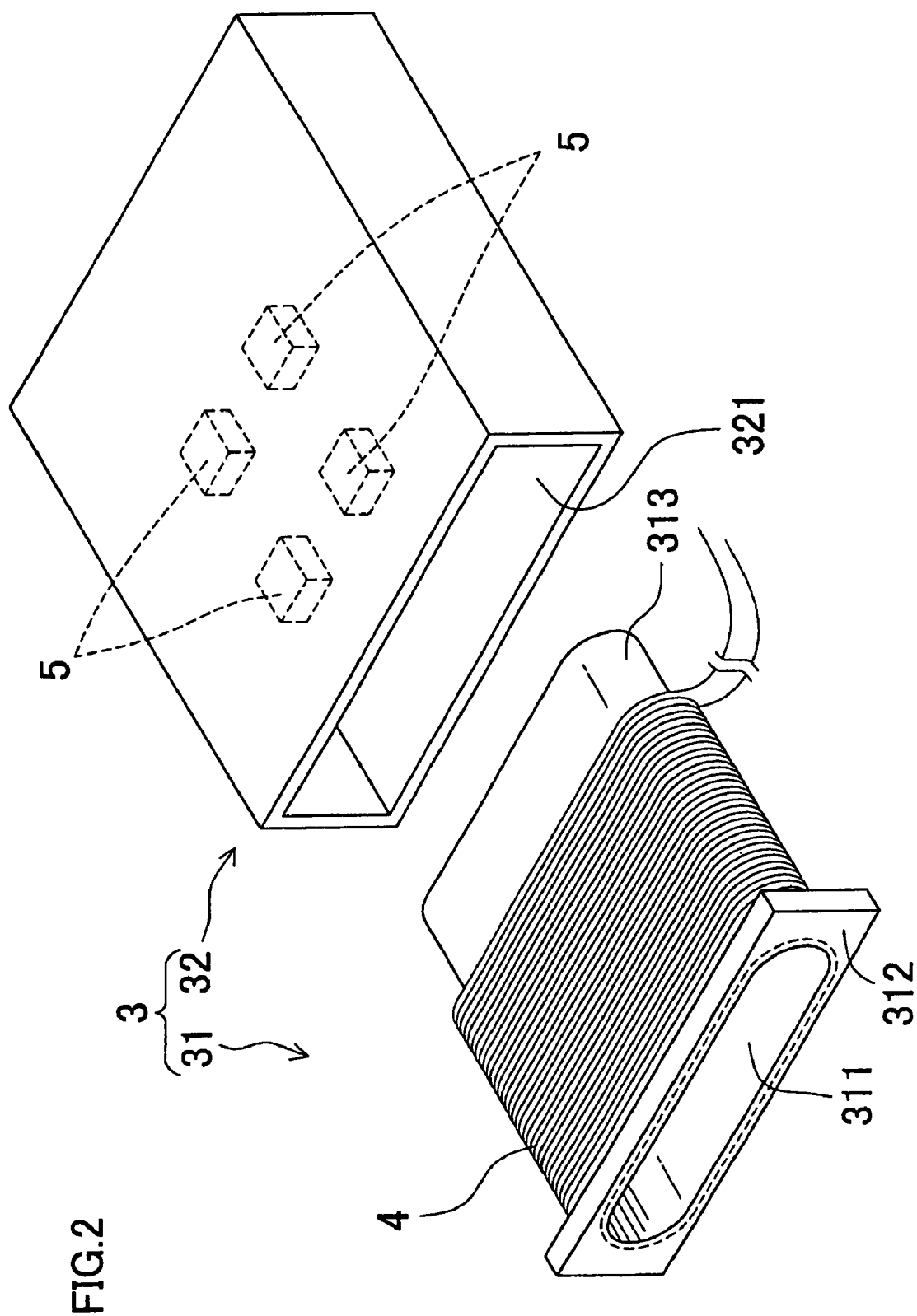
FIG. 2 is a perspective view of a casing assembly incorporated in the data eraser for arranging a coil as shown disassembled to its components.

A casing assembly 3 of a box shape for arranging a coil shown in FIG. 2 is incorporated in the eraser 1. The casing assembly 3 consists essentially of a first casing component 31 made of plastic and a second casing component 32 also made of plastic. The first casing component 31 includes a rectangular flange 312 having an opening 311 of an oval (a racetrack) shape and a coil holder 313 of a tubular shape extending backward of the flange 312 from the edge of the opening 311 of the flange 312. The opening 311 and the internal space of the coil holder 312 form the cavity 2 for insertion of the hard disk drive.

A conductive wire is wound around the coil holder 313 forming a multiplicity of loops toward a longitudinal direction of the coil holder 313 along its outer periphery, thereby forming a coil 4.

The second casing component 32 in the casing assembly 3 is of a rectangular cylinder with one open end. A shape of an opening 321 is almost in conformity with that of the flange 312 of the first casing component 31. A plurality of permanent magnets 5 are embedded in an inner surface of an upper part of the second casing component 321 with the upper parts of the magnets 5 at a slightly inner portion of the upper wall.

The coil 4 formed around the coil holder 313 of the first casing component 31 produces a magnetic field within the internal space of the coil 4 (viz. the internal space of the coil holder 313) by being energized, by which magnetic field, data on the hard disk is erased, as described below.

The permanent magnets 5 secured to the second casing component 32 apply a magnetic field produced thereby to the magnetic field produced by the coil 4, thereby applying a stronger magnetic field for erasing data to the hard disk drive. In other words, the permanent magnets 5 are for an auxiliary for erasing data by the magnetic field in the coil 4.

Therefrom, the casing assembly 3 for arranging a coil is formed by assembling the first and second casing components 31 and 32 with the coil holder 313 of the first casing component 31 being accommodated inside the second casing component 32 from its opening 321, and with the flange 312 of the first casing component 31 being engaged with the opening 321.

Figure 3:
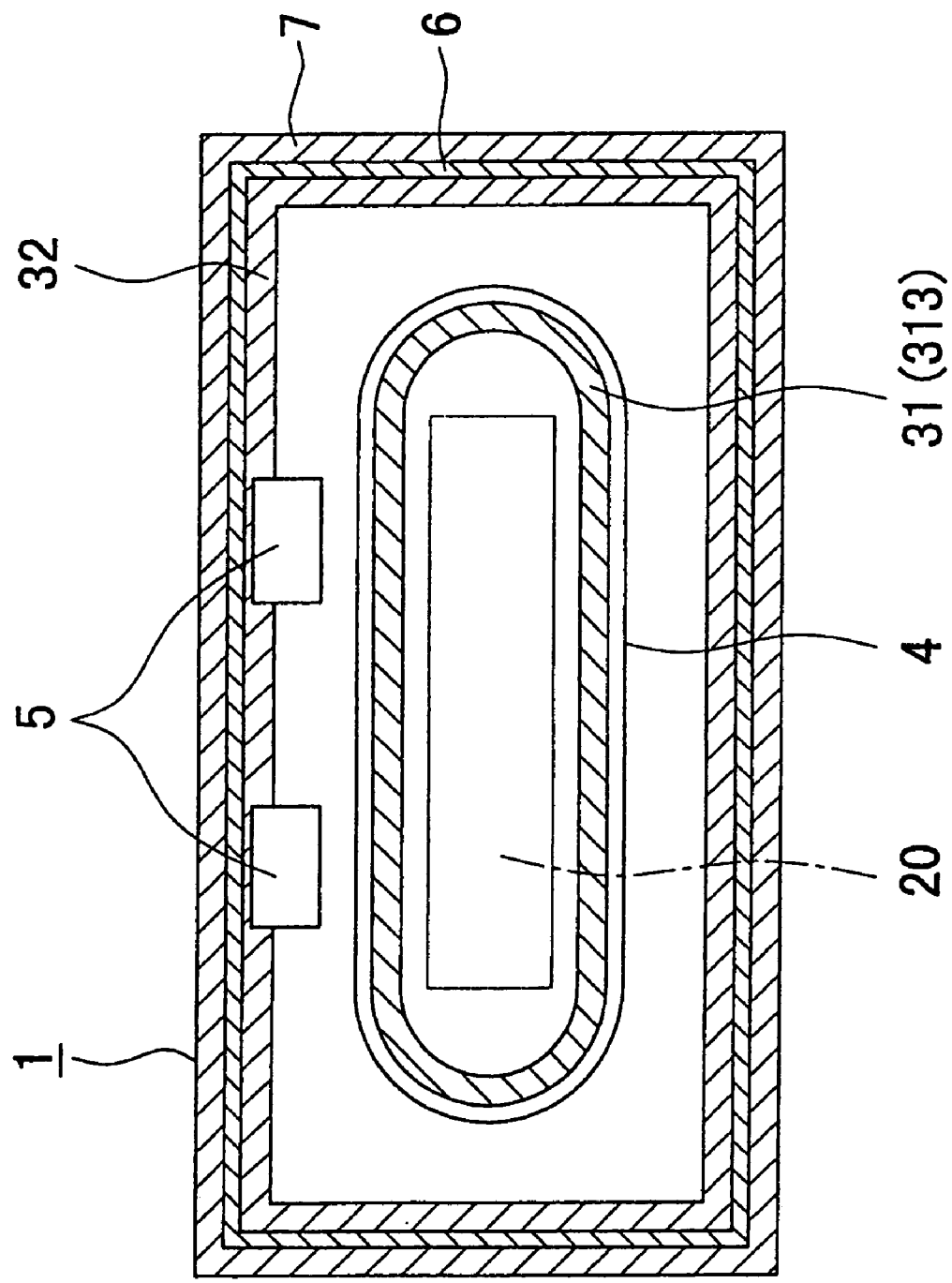
FIG. 3 is a cross-sectional view taken along line III-III of FIG. 1.

As seen in FIG. 3, the outer periphery of the casing assembly 3 except the opening 311 of flange of the first casing component 31 is clad in a magnetic-shielding plate 6 made of nonmagnetic material such as aluminum, so that magnetism by both the coil 4 and the permanent magnets 5 is prevented from leaking out of the eraser as much as possible. Further, the outer periphery of the magnetic-shielding plate 6 is clad in plastic outer covering 7.

Figure 4:
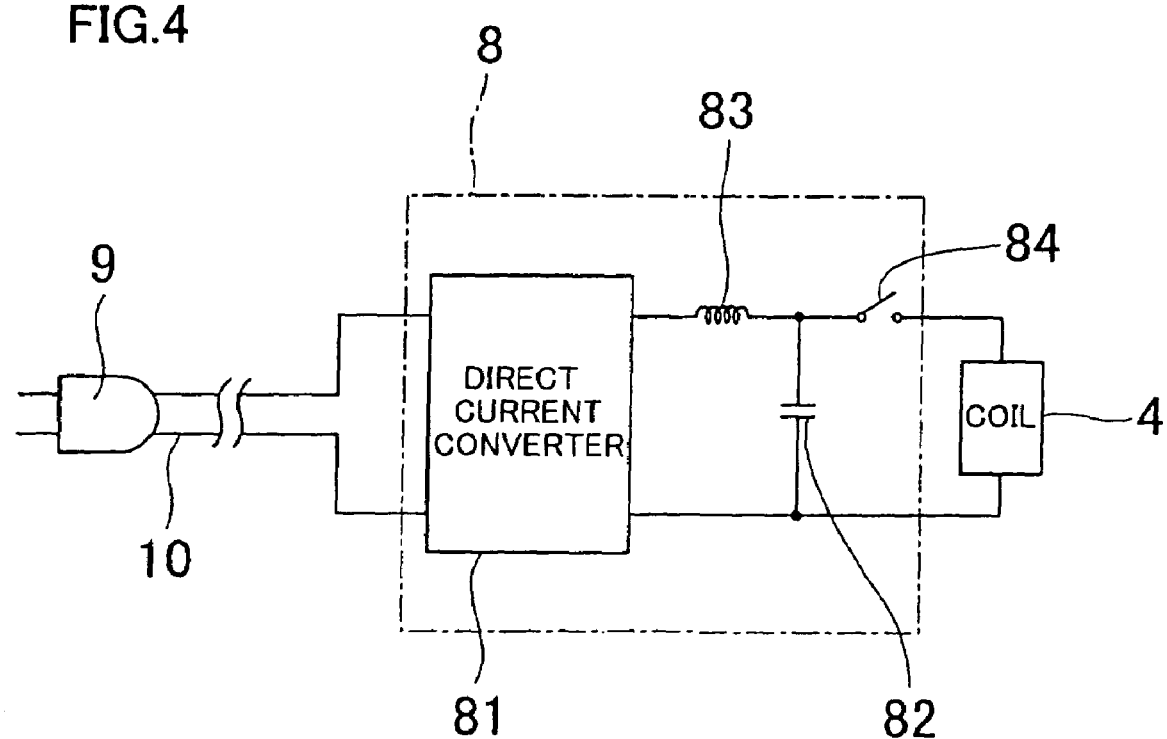
FIG. 4 is a circuit diagram of a DC power supply circuit built in the data eraser of FIG. 1.

Electric power is supplied to the coil 4 from a DC power supply circuit 8 shown in FIG. 4 and incorporated in the eraser. The reference numeral 9 denotes a plug to connect the DC power supply circuit 8 with a commercial AC power source and the reference numeral 10 denotes a wiring cord pulled out from the data eraser 1.

The DC power supply circuit 8 shown in FIG. 4 includes a direct current (DC) converter 81 for converting a commercial alternating current applied via the plug 9 into a direct current of a predetermined power voltage, a capacitor 82 charged by an electric power supply from the DC converter 81 and connected in parallel with the coil 4, an reactor 83 connected in an input line from the DC converter 81 to the capacitor 82, and a switching device 84 connected between the capacitor 82 and the coil 4. Closing the switching device 84 discharges the capacitor 82 to the coil 4, and by the discharge, the coil 4 produces the magnetic field therein. Next, a method for using the data eraser 1 shown in FIGS. 1 to 4 will be described in detail below.

With the switching device 84 of the DC power supply circuit 8 open, after the plug 9 of the eraser 1 is connected to the commercial power source, as seen in FIGS. 1 and 2, a hard disk drive 20 whose data is to be erased is inserted into the cavity 2 of the eraser 1 without exposing a hard disk therein, with the disk clad in a metal casing, and with the depth direction adjusted hightwise. The capacitor 82 of the DC power supply circuit 8 is charged by an electric power supply from the direct current converter 81.

In this state, closing the switching device 84 discharges the capacitor 82 to the coil 4 and the discharge produces a magnetic field in the internal space of the coil 4, that is, the cavity 2 where the hard disk drive 20 is inserted. On the other hand, a magnetic field by the permanent magnets 5 secured above the coil 4 also exerts on the cavity 2, so that both of the magnetic fields by the coil 4 and the magnets 5 exert on the hard disk drive 20.

Magnetism by these magnetic fields penetrates the metal casing made of such as aluminum and iron of the hard disk drive 20 to exert on the hard disk therewithin, thereby erasing data recorded on the hard disk including cylinder information. After duration of a predetermined time, closing the switching device 84 stops producing the magnetic field by the coil 4 so as to prepare for another data erase.

It is required to exert a stronger magnetism than a written magnetism on the hard disk drive 20 for erasing written data including cylinder information. From this view, the stronger the magnetism by the coil 4 and the permanent magnets 5 which exerts on the cavity 2 is the better.

However, the hard disk drive 20 incorporates a controlling portion for controlling the drive besides the hard disk of a disc shape for writing data, so that too much enlargement of the magnetic field for data erasing not only erases data but also destroys the controlling portion, resulting in a difficulty of a reuse of the drive 20.

Consequently, a size of the magnetic field acting on the drive 20 is preferably set within the range of 6,000 to 15,000 gauss at a magnetic flux density. The magnetic flux density less than 6,000 is inadequate to erase data. On the other hand, the magnetic flux density more then 15,000 destroys not only data but also the controlling portion. More preferably, it is within the range of 8,000 to 13,000 gauss.

Herein, an intensity of the magnetic field by the coil 4 is adjustable depending on change of the number of winding of the coil and a current applied to the coil.

Insertion of the hard disk drive 20 into the coil 4 in which the strong magnetic field is produced obtains a large data erase effects with a little weight of the coil. That is, the entire weight of the eraser 1 can be made lighter. However, a combination of the coil 4 and the permanent magnets 5, as the preferred embodiment, can provide further lighter in weight than a use of the coil 4 alone to obtain the magnetic flux density within the range of 6,000 to 15,000 gauss without the magnets 5. More specifically, obtaining the magnetic flux density within the range of 6,000 to 15,000 gauss with the magnets 5 alone requires the entire weight exceeding 40 kg, compared with 4 kg with the coil 4 alone, and the eraser 1 can be provided lighter in weight and portable.

Further, a combination of the coil 4 and the magnets 5 makes its weight about 2 kg, a half weight of the case described above. In this case, it is needless to say that the eraser 1 can be portable.

Duration for which the magnetic field is produced in the coil 4, in other words, for which that the switching device 84 is closed, is not limited particularly, but preferably set for 10 ms or less. Even if the duration exceeds 10 ms, it achieves the same effect of data erase, or rather lowers energy efficiency and wastes time.

The hard disk drive 20 whose data is erased as described above is ejected from the cavity 2 of the eraser 1, and abandoned or reused, depending on need.

Since the preferred embodiment has a coil for production of a magnetic field arranged around a cavity so as to encircle a hard disk drive, a strong magnetism produced in the coil is used for erasing data, thereby erasing data on a hard disk not only with the disk in the drive exposed but also with the disk clad in a metal casing.

Further, the magnetic field produced in the coil is used effectively, so as to make the coil smaller and lighter in weight and thus making the entire eraser lighter in weight, compared with a conventional arrangement of a hard disk drive at the outer side of the coil.

Further, in the case of a permanent magnet provided in a position where the magnet exerts a magnetic force on the hard disk drive inserted in the cavity, it ensures further lightness in its weight.

Still further, in the case of the magnetic field produced in the cavity set within the range of 6,000 to 15,000 gauss at the magnetic flux density, it makes sure to erase data.

In the case of the DC power supply circuit including a capacitor for charging and discharging and a switching device for discharging the capacitor into the coil, discharging the capacitor into the coil by the switching device produces the magnetic field in the coil.

In this case, setting production of the magnetic field in the coil by the discharge of the capacitor for duration of 10 ms or less enables an efficient data erase in a short period.

Hereinbefore, having described specific embodiments of the present invention in detail, the invention in not limited thereto, and various changes and modifications may be made in the invention without departing from the spirit and scope thereof.

INDUSTRIAL APPLICABILITY

The present invention is applicable as an eraser of data recorded on a hard disk drive.

The invention claimed is:

1. A recorded data eraser for a hard disk drive defining therein a cavity for insertion of the hard disk drive in the cavity and comprising:
   a coil being arranged around the cavity so as to encircle the hard disk drive when the hard disk drive is inserted in the cavity;
   a DC power supply circuit for producing a magnetic field in the coil to erase data on the hard disk drive;
   a permanent magnet provided in a position where the magnet exerts a magnetic force on the hard disk drive inserted in the cavity to erase data on the hard disk drive; and
   a magnetic-shielding plate that blocks magnetism from leaking out of the recorded data eraser,
   the magnetic field in the coil and magnetic force exerted by the permanent magnet cooperating to each erase data on the hard disk drive.

2. The recorded data eraser as defined in claim 1, wherein the hard disk drive is insertable in the cavity and the magnetic-shielding plate is made from a metallic material that is part of a casing around the hard disk drive in the cavity.

3. The recorded data eraser as defined in claim 1, adapted to maintain a magnetic flux density in the cavity within the range of 6,000 to 15,000 gauss in erasing data in the hard disk drive.

4. The recorded data eraser as defined in claim 3, wherein the DC power supply circuit comprises a capacitor for charging and discharging and a switching device for discharging the capacitor into the coil.

5. The recorded data eraser as defined in claim 4, adapted to produce a magnetic field in the coil by the discharge of the capacitor for a duration of 10 ms or less.

6. The recorded data eraser as defined in claim 1, adapted to maintain a magnetic flux density in the cavity within the range of 8,000 to 13,000 gauss in erasing data in the hard disk drive.

7. The recorded data eraser for as defined in claim 1, wherein the DC power supply circuit comprises a capacitor for charging and discharging and a switching device for discharging the capacitor into the coil.

8. The recorded data eraser as defined in claim 7, adapted to produce a magnetic field in the coil by the discharge of the capacitor for a duration of 10 ms or less.

9. A recorded data eraser for a hard disk drive defining therein a cavity for insertion of the hard disk drive in the cavity and comprising:
   a coil being arranged around the cavity so as to encircle the hard disk drive when the hard disk drive is inserted in the cavity;
   a DC power supply circuit for producing a magnetic field in the coil to erase data on the hard disk drive; and
   a permanent magnet provided in a position where the magnet exerts a magnetic force on the hard disk drive inserted in the cavity to erase data on the hard disk drive,
   the magnetic field in the coil and magnetic force exerted by the permanent magnet cooperating to each erase data on the hard disk drive.

10. The recorded data eraser as defined in claim 9, wherein the hard disk drive is insertable in the cavity with the drive clad in a metal casing.

11. The recorded data eraser as defined in claim 9, adapted to maintain a magnetic flux density in the cavity within the range of 6,000 to 15,000 gauss in erasing data in the hard disk drive.

12. The recorded data eraser as defined in claim 11, wherein the DC power supply circuit comprises a capacitor for charging and discharging and a switching device for discharging the capacitor into the coil.

13. The recorded data eraser as defined in claim 12, adapted to produce a magnetic field in the coil by the discharge of the capacitor for a duration of 10 ms or less.

14. The recorded data eraser as defined in claim 9, adapted to maintain a magnetic flux density in the cavity within the range of 8,000 to 13,000 gauss in erasing data in the hard disk drive.

15. The recorded data eraser as defined in claim 9, wherein the DC power supply circuit comprises a capacitor for charging and discharging and a switching device for discharging the capacitor into the coil.

16. The recorded data eraser as defined in claim 15, adapted to produce a magnetic field in the coil by the discharge of the capacitor for a duration of 10 ms or less.

17. A recorded data eraser for a hard disk drive defining therein a cavity for insertion of the hard disk drive in the cavity and comprising:
   a coil being arranged around the cavity so as to encircle the hard disk drive when the hard disk drive is inserted in the cavity;
   a DC power supply circuit for producing a magnetic field in the coil to erase data on the hard disk drive; and
   a permanent magnet provided in a position where the magnet exerts a magnetic force on the hard disk drive inserted in the cavity to erase data on the hard disk drive;

adapted to maintain a magnetic flux density in the cavity within the range of 6,000 to 15,000 gauss in erasing data in the hard disk drive, wherein the DC power supply circuit comprises a capacitor for charging and discharging and a switching device for discharging the capacitor into the coil, and adapted to produce a magnetic field in the coil by the discharge of the capacitor for a duration of 10 ms or less, the magnetic field in the coil and magnetic force exerted by the permanent magnet cooperating to each erase data on the hard disk drive.

18. A recorded data eraser for a recording medium defining therein a cavity for insertion of the recording medium in the cavity and comprising:

a coil being arranged around the cavity so as to encircle the recording medium when the recording medium is inserted in the cavity;

a DC power supply circuit for producing a magnetic field in the coil to erase data on the recording medium;

a permanent magnet provided in a position where the magnet exerts a magnetic force on the recording medium inserted in the cavity to erase data on the recording medium; and a magnetic-shielding plate that blocks magnetism from leaking out of the recorded data erasers, the magnetic field in the coil and magnetic force exerted by the permanent magnet cooperating to each erase data on the recording medium.

19. A recorded data eraser for a recording medium defining therein a cavity for insertion of the recording medium in the cavity and comprising:

a coil being arranged around the cavity so as to encircle the recording medium when the recording medium is inserted in the cavity;

a DC power supply circuit for producing a magnetic field in the coil to erase data on the recording medium; and a permanent magnet provided in a position where the magnet exerts a magnetic force on the recording medium inserted in the cavity to erase data on the recording medium, the magnetic field in the coil and magnetic force exerted by the permanent magnet cooperating to each erase data on the recording medium.

20. A recorded data eraser for a recording medium defining therein a cavity for insertion of the recording medium in the cavity and comprising:

a coil being arranged around the cavity so as to encircle the recording medium when the recording medium is inserted in the cavity to erase data on the recording medium;

a DC power supply circuit for producing a magnetic field in the coil; and a permanent magnet provided in a position where the magnet exerts a magnetic force on the recording medium inserted in the cavity to erase data on the recording medium;

adapted to maintain a magnetic flux density in the cavity within the range of 6,000 to 15,000 gauss in erasing data in the recording medium, wherein the DC power supply circuit comprises a capacitor for charging and discharging and a switching device for discharging the capacitor into the coil, and adapted to produce a magnetic field in the coil by the discharge of the capacitor for a duration of 10 ms or less, the magnetic field in the coil and magnetic force exerted by the permanent magnet cooperating to each erase data on the recording medium.

* * * * *